3,179,616
HEAT SETTABLE INK
George W. Reinke, Palos Verdes Estates, Calif., assignor to Rineglas, Inc., a corporation of Illinois
No Drawing. Filed June 25, 1962, Ser. No. 205,071
1 Claim. (Cl. 260—31.8)

This invention relates in general to a heat settable or curable ink and method of drying or curing same, and more particularly to a method of printing and curing of a film of ink imprinted onto a backing or supporting member. Still more particularly, the invention relates to the method of printing and curing a film of the ink imprinted onto a supporting surface or backing member, including quickly drying or curing the imprinted ink, and imparting a finish to the external ink surface, wherein the cured film thickness is substantially the same as the wet film thickness.

The ink of the present invention is useful in the printing industry, wherein it is to be imprinted on any suitable ink-receptive material, such as paper, paperboard, fabric and metal, and wherein extremely rapid drying or curing of the ink is effected by momentary application of heat directly to the ink. More particularly, the ink of the present invention is especially useful in silk screen printing applications, wherein the ink is applied in any thickness desired, such as from one-half a mil to in excess of one mil. Since the ink of the present invention is of a type that substantially does not change in volume between the wet and cured state, when a one-half mil film or thickness of ink is applied to a backing sheet in wet form, the entire ink thickness will remain substantially the same after the ink is cured. While the conventional ink of the prior art, having a substantial amount of solvents needed for drying, would require a deposit of .001 to .0018 inch thick when wet to produce a dry or cured thickness of .0006 inch. Thus, the hiding power (opacity) of the ink of the present invention is high and it is therefore easy to cover other print with the ink of the present invention, without having to apply an extremely heavy film in the first instance.

Inasmuch as the ink of the present invention would include very little if any solvent, it is especially suitable for silk screen printing since it will not dry on the screen, and this feature eliminates the necessity of much screen maintenance. Moreover, the finish on the ink surface of the instant ink may be varied in accordance with the method of curing as will be hereinafter explained, without necessitating the changing of the ink supply as was heretofore required.

The heat curable or settable ink of the present invention is a plastisol mixture of finely divided particles of vinyl resin, along with pigment particles, in suspension in plasticizer materials. More particularly, the mixture includes a plasticizer, a monomer, a catalyst for the monomer, a polyvinyl resin and a pigment, which mixture will set up or cure only upon being subjected to a predetermined amount of heat. It should be appreciated that other additives may modify the mixture in order to condition the mixture for a particular situation. Partial curing of the ink may be accomplished at relatively low temperatures, and full curing of the ink may be accomplished at somewhat higher temperatures. This mixture will stay wet indefinitely, and until it is subjected to sufficient heat.

An example of one specific ink formula of the present invention is as follows:

Plasticizer—20 parts by weight dioctyl phthalate
Monomer—20 parts by weight high boiling low viscosity monomeric ester (experimental monomer X970, Rohm & Haas; 1,3-butylene glycol di-methacrylate)
Catalyst—4/10 part by weight benzoyl peroxide
Polyvinyl resin—80 parts by weight high molecular weight polyvinyl chloride resin (Geon 121 resin, B. F. Goodrich)
Pigment—30 parts by weight titanium dioxide The above ink example will set up partially at between 200–225° F., and fully at between 300–325° F. In some instances of the printing of the ink, it is not necessary to completely cure the ink, but where maximum durability is desired, a complete curing of ink is necessary. It should be further appreciated that the ink curing temperature depends upon the formulation of the ink. Moreover, the formulation may be adjusted to vary the resulting rigidity of the cured ink, and/or other characteristics.

The method of curing a film of the ink when applied to a backing sheet or web, such as when printing on a sheet or web of paper, involves the direct application of a sufficient amount of heat to the external surface of the ink to effect setting or curing thereof. Application of heat against the external surface of the ink may be carried out by directly engaging the external surface of the ink with a suitable heated element such as a plate, roller or belt. For example, a sheet having wet ink imprinted thereon may be carried against or around a heated hollow drum or roller, or against a heated belt with the external surface of the ink in direct engagement with the roller or belt surface. The linear speed of the sheet would be the same as that of the roller or belt surface. Similarly, a heated plate may be applied against the external surface of the ink for the curing operation where the sheet would be stationary. Thus the heat is applied directly to the ink for drying or curing of the ink. The sheet imprinted with the ink will have greater ink adhering characteristics than the roller, belt or plate surface in order to prevent transfer of the ink to the roller, belt or plate.

It should be appreciated that only momentary contact would be established between a moving sheet or web of material and a rotating drum or roller or moving belt, in which case the roller, drum or belt would be heated to such a temperature to thereby heat the ink film to the necessary setting temperature.

A desired finish on the external surface of the ink is obtained by a combination of pressure, heat, and the heated element surface. Where the heated element and imprinted sheet material are moving, the heat and pressure components will vary with the speed and type of paper or supporting surface being printed. For example, the pressure should be such as to give the proper finish but not to be excessive as to move or spread the print on the paper. If a smooth, glossy finish is desired on the cured ink surface, a polished roller, belt or plate may be employed. More particularly, the roller may have a highly polished chrome surface. On the other hand, if a textured pattern is desired on the cured ink surface for the ink finish, a textured roller may be employed. For example, a dull ink finish may be accomplished by using a roller having a Teflon surface. Other finishes may be provided with rubber-surfaced rollers. Accordingly, various ink finishes may be provided with the same basic ink and by merely changing the roller surface.

The present invention of having a heat settable or curable ink and a method of setting the ink by use of a roller or the like materially speeds up printing operations especially in the silk screen printing art, and now allows use of high speed printing equipment. For example, the ink may be dried or cured by passing the imprinted sheet material over a heated roller or suitable element with the ink directly in engagement with the heated element, and thereby permit drying or curing times as short as approximately one-half a second. Such short drying or curing times permits immediate stacking of printed sheets, and immediate further printing of other colors or other designs, such as where presses may be arranged in tandem for several printing operations. In fact, by applying heat only to the ink, the supporting surface of the ink such as paper would not even be heated. And the ink, when imprinted on a backing sheet, being liquid and wet and in intimate contact with a heated element, conducts the heat more rapidly to hasten the curing process. Moreover, because the volume or film thickness of the ink of the present invention does not change to any degree, savings in ink may be realized over using inks with solvents.

The method of curing is described herein in connection with one type of plastisol mixture that may be defined as a mixture having a one hundred percent solids in that film thickness, wet and cured, remain the same, but the method may well be employed with other plastisol mixtures having ninety to one hundred percent solids. Moreover, the ink drying or curing method of this invention may be applied to other heat settable resins.

It will be understood that modifications and variations may be effected without departing from the scope of the novel concepts of the present invention, but it is understood that this application is to be limited only by the scope of the appended claim.

The invention is hereby claimed as follows:

A heat settable ink consisting essentially of by weight, twenty parts of plasticizer, twenty parts of high boiling low-viscosity monomeric ester, four-tenths part of catalyst, eighty parts of polyvinyl resin, and thirty parts of pigment, wherein said ingredients are such as to define an ink that when set will have substantially the same volume as when wet, and said plasticizer consisting of dioctyl phthalate, said monomeric ester consisting of 1,3-butylene glycol di-methacrylate, said catalyst consisting of benzoyl peroxide, said resin consisting of polyvinyl chloride resin, and said pigment consisting of titanium dioxide.

References Cited by the Examiner
UNITED STATES PATENTS

| | | | |
|---|---|---|---|
| 2,539,207 | 1/51 | Saford | 260—31.8 |
| 2,830,032 | 4/58 | Siebel | 260—45.5 |
| 3,024,213 | 3/62 | Ludlow | 106—20 |

MORRIS LIEBMAN, *Primary Examiner.*

LESLIE H. GASTON, *Examiner.*